United States Patent
Nagel et al.

(10) Patent No.: US 8,545,653 B2
(45) Date of Patent: Oct. 1, 2013

(54) ADHESIVE TAPE FOR PRODUCING A JOINT DURING A STATIC REEL CHANGE

(75) Inventors: Christoph Nagel, Hamburg (DE);
Bernhard Gebbeken, Hamburg (DE)

(73) Assignee: tesa SE, Hamburg (DE)

( * ) Notice: Subject to any disclaimer, the term of this patent is extended or adjusted under 35 U.S.C. 154(b) by 687 days.

(21) Appl. No.: 12/974,158

(22) Filed: Dec. 21, 2010

(65) Prior Publication Data

US 2011/0083802 A1     Apr. 14, 2011

Related U.S. Application Data

(62) Division of application No. 11/776,832, filed on Jul. 12, 2007, now abandoned, which is a division of application No. 11/104,860, filed on Apr. 13, 2005, now abandoned.

(30) Foreign Application Priority Data

Oct. 6, 2004   (DE) .......................... 10 2004 048 880

(51) Int. Cl.
*B65H 21/00* (2006.01)

(52) U.S. Cl.
USPC ........................................................ 156/157

(58) Field of Classification Search
USPC ........................................................ 156/157
See application file for complete search history.

(56) References Cited

U.S. PATENT DOCUMENTS

2003/0134111 A1   7/2003   Gebbeken et al.

FOREIGN PATENT DOCUMENTS

| DE | 42 33 521 A1 |   | 4/1994 |
|----|----|----|----|
| DE | 4233521 A1 | * | 4/1994 |
| DE | 43 45 162 A1 |   | 12/1995 |
| DE | 198 41 609 A1 |   | 3/2000 |
| DE | 199 02 179 A1 |   | 8/2000 |
| DE | 199 56 442 A1 |   | 1/2001 |
| DE | 102 01 404 A1 |   | 9/2003 |
| EP | 1 327 672 A1 |   | 7/2003 |

* cited by examiner

*Primary Examiner* — Katarzyna Wyrozebski Lee
*Assistant Examiner* — John Blades
(74) *Attorney, Agent, or Firm* — Norris McLaughlin & Marcus, P.A.

(57) ABSTRACT

In order to provide an adhesive tape for producing a joint during a static reel change between two flat web materials wound up onto reels, having a carrier and a self-adhesive compound, with which the exposure of the self-adhesive compound during the further processing of the webs bonded to each other is avoided, it is proposed that, in the self-adhesive compound, a gap be formed in the longitudinal direction of the adhesive tape, in order to form two self-adhesive compounds having a spacing (V), as viewed in the width of the adhesive tape. Furthermore, a corresponding method is proposed.

11 Claims, 4 Drawing Sheets

ADHESIVE TAPE FOR PRODUCING A JOINT DURING A STATIC REEL CHANGE

This application is a Divisional of U.S. patent application Ser. No. 11/776,832, filed Jul. 12, 2007, now pending, which is, in turn, a Divisional of U.S. patent application Ser. No. 11/104,860, filed Apr. 13, 2005, which claims foreign priority benefit under 35 U.S.C. §119 of the German Patent Application No. 10 2004 048 880.0 filed Oct. 6, 2004, incorporated herein by reference.

The invention relates to an adhesive tape for producing a joint during a static reel change between two flat web materials wound up onto reels, having a carrier and a self-adhesive compound.

Flat web materials, in particular paper, are wound up onto reels in order, for example, to be supplied to a paper-processing machine or to a printing or packaging machine. During a static reel change, the reels, such as a parent paper reel, are stopped, that is to say their rotation is stopped, the end of the one parent reel is stuck to the start of the other and the new parent reel can then be set rotating again. The static reel change, carried out manually by production employees, from an empty to a full reel is a familiar process in paper mills or the like in order, inter alia, to obtain continuous paper webs. In the paper industry, this method is used, for example, on rewinders, slitter-rewinders and cross-cutters. A static reel change is a complicated procedure which normally has to be carried out by two specialists.

The joint between old and new paper web, which is also designated a splice ("to splice"), is frequently contained in the paper web composed in this way and is supplied to an end customer. In order to produce joints of this type, double-sided adhesive tapes (German "Fixe") or single-sided adhesive tapes are known. The carriers used for the adhesive tapes are normally paper carriers and also water-soluble self-adhesive compounds, which are coated onto one or both sides of the carrier.

In the case in which a double-sided adhesive tape is used to produce a joint, the adhesive tape is stuck to the outer ply of the web material substantially in the longitudinal direction of a full reel of the web material. Then, on the side of the adhesive tape that points radially outwards, the release or covering paper is pulled off the other self-adhesive compound, and the end of the web of the empty reel, such as the paper web of the empty parent reel, is stuck onto the self-adhesive compound. Any projecting paper residues can be cut off or torn off.

Half of single-sided adhesive tapes are stuck under the end of the uppermost ply of one reel such that substantially still half of the self-adhesive compound, as viewed in the width of the adhesive tape, is available to be stuck to the other web end. The single-sided adhesive tapes are advantageously provided with a centrally slit release or covering paper, so that the bonds can be made one after another, in each case only a section of the release paper being pulled off. Bonding with single-sided adhesive tapes is used in particular in bonds which remain in a paper reel for a longer time. Because of their lower thickness, they do not cause any pressure points during the further processing of the paper web, and the elastic self-adhesive compound is not squeezed out laterally by the further processing.

The adhesive tapes used are always distinguished by particularly shear-resistant, mostly water-soluble adhesive compounds, since otherwise there is the risk of failure under the high tensile stresses or, during winding up onto reels and relatively long storage, the adhesive tapes squeeze out and thus stick to the next paper plies, which can then lead to problems during the further processing but, on the other hand, because of their water-soluble self-adhesive compounds and paper carriers, do not cause disruption in the papermaking machine when the paper waste is reused.

Furthermore, single-sided adhesive tapes are known which are provided with a cleavable system on their rear side, which is opposite the self-adhesive compound which is coated onto the carrier. In this case, the cleavable system, which substantially likewise comprises a double-sided adhesive tape, is stuck onto the second outer ply of the web material on the reel, in order in this way to fix the outer ply, which is half-stuck to the exposed self-adhesive compound of the adhesive tape, to the reel. As soon as the end of the old web has been stuck firmly to the other half of the self-adhesive compound of the adhesive tape and the web material is, for example, pulled into a paper-processing machine, the cleavable system, preferably the carrier of this double-sided adhesive tape, is cleaved by the forces which occur and which act substantially at right angles to the main plane of the adhesive tape, the outer ply is unwound from the reel and supplied to the machine, the self-adhesive compound on the second outer ply being covered in a non-adhesive way by the cleavable system.

In the case of single-sided adhesive tapes it is to be seen as disadvantageous that, on account of the high tensile forces in the web material, following the production of the joint it is possible for the two web ends to be pulled apart in the longitudinal direction of the web material at the adhesive bond. As a result, the self-adhesive compound is exposed at the gap pulled open between the two web ends and, for example when wound onto a new reel, can stick in an undesirable way to the web lying above. A further disadvantage can arise if, when the projecting webs are torn, they are not torn with straight edges and the webs overlap partly. As a result of this overlapping, undesired thickenings occur which, in the wound reel, can lead to pressure points or to problems in the further processing of the paper reel, for example during printing.

On the basis of this prior art, those skilled in the art are presented with the object of specifying an adhesive tape with which a static reel change can be carried out in a simple manner, the intention being for the occurrence of uncovered regions of the self-adhesive compound to be avoided, even under high tensile loadings in the web material. Furthermore, a corresponding method is to be specified.

These objects are achieved by the features specified hereinbelow.

The basic idea of the invention is that the self-adhesive compound is not arranged distributed as a continuous layer substantially over the entire surface of the adhesive tape but has a gap or break extending in the longitudinal direction of the adhesive tape, in order in this way to divide the self-adhesive compound into two substantially symmetrical sections. In this case, the gap is preferably arranged centrally, as viewed in the width of the adhesive tape.

With this adhesive tape having two separate sections of the self-adhesive compound, during the manual production of a joint between the web materials during a static reel change, it is possible for example for paper webs in each case to be stuck onto the two self-adhesive compounds spaced apart by the gap in such a way that, as viewed towards the centre of the adhesive tape, the self-adhesive compounds in each case completely cover or at least partly cover the gap between the self-adhesive compounds. This means that the spacing between the mutually facing ends of the webs is less than the width of the gap. This ensures that, in the event that tensile forces occur in the bonded web, which can lead to a slight displacement of the respective web ends at the joint, exposure of regions of the self-adhesive compound does not occur immediately, since the ends of the respective webs are arranged so as to overlap the self-adhesive compounds. It is possible for those skilled in the art to choose the width of the gap or the holding time of the self-adhesive compounds in such a way that, even under the greatest tensile stresses that occur in the web material, the ends are in each case at most displaced relative to the self-adhesive compounds to such an extent that the latter are just still completely covered, in order to avoid bonds to further webs or plies of the material, for example when wound up onto a new reel.

The advantage of the invention is that, with a single-sided adhesive tape, thin joints can be produced which, in particular for the end customer for the webs bonded to each other, cause virtually no problems during further processing. Furthermore, as a result of the configuration having two mutually spaced self-adhesive compounds, it is ensured that exposure of the self-adhesive compound does not occur, even under high tensile loadings.

Advantageous refinements of the invention are also described hereinbelow.

According to one refinement, it is proposed that a cleavable system be arranged on the side of the carrier facing away from the self-adhesive compounds, that is to say on its rear side. It is also possible for a plurality of cleavable systems to be provided. With this cleavable system, the adhesive tape can be fixed in a manner known per se onto the second outer ply of the web wound up onto a reel. For this purpose, a covering film of the cleavable system is pulled off manually and the adhesive tape, of which half has already been stuck from below to the end of the web on the reel, is stuck to the second outer ply. In this case, the cleavable system advantageously has a considerably smaller cleavage resistance than a paper carrier, which has to absorb tensile forces. Within the scope of the invention, it is also possible for a plurality of cleavable systems, in particular even of different, cleavable systems, to be arranged on the rear side of the adhesive tape. These preferably comprise sized, highly compacted paper from a composite of paper and film or a composite of two films, it being possible for the composite to consist of papers and/or films connected in a defined manner point by point and/or line by line. For this purpose, for example, the following papers, paper composite systems or films are suitable: easily cleavable paper systems, duplex papers, that is to say papers laminated together in a defined manner, in which the cleavage operation proceeds homogeneously and no stress peaks occur, in particular for wallpapers and filters, or highly compacted papers glued together in a defined manner and having a high tear propagation resistance. The gluing can be carried out, for example, with starch, starch-containing derivatives, and wallpaper paste based on methyl cellulose or polyvinyl alcohol derivatives. Such systems are described, for example, in DE 199 56 442, paragraph 4, lines 35ff. Furthermore, cleavable systems are known in which the cleavage forces are determined by the magnitude, structure and sum of the bonding points (DE 198 41 609, paragraph 2, line 22). The use of coextruded films is also possible. In the case of a plurality of cleavable systems on an adhesive tape, these can consist of the same material and thus exhibit the same cleavage forces but it is also possible to form the cleavable systems in each case from different materials, in order to assign them different cleavage forces. The tear propagation resistance of the cleavable system is preferably between 5 and 70 cN/cm, in particular 12 to 60 cN/cm. With regard to the measurement of the tear propagation resistance, reference is made to DE 199 02 179 A1.

The carrier, as viewed in the transverse direction of the adhesive tape, is advantageously wider than the cleavable system or systems, as specified hereinbelow. This means that the carrier, as viewed in cross section or in the width of the adhesive tape, laterally overlaps or projects beyond the cleavable systems. As viewed in the transport direction of the web, the carrier can project beyond the cleavable system or systems in the region of the leading edge of the adhesive tape by up to 20 mm, in order to ensure the cleavage of the system reliably when the web is unwound from the new reel. In particular embodiments, this projection can also be less, for example between 0.5 and 15 mm, in a further preferred way between 1 and 7 mm and, in a particularly preferred way, between 1.5 and 3.5 mm. If a plurality of cleavable systems is arranged on the rear side of the carrier of the adhesive tape, then the spacing of the cleavable systems from one another is, for example, 3 to 40 mm, in particular 25 to 45 mm and, particularly advantageously, 20 to 30 mm.

In another refinement proposed, the self-adhesive compound has a holding time of at least 1000 minutes on coating body paper and at least 2000 minutes on gravure printing paper, in each case measured at 23° C. and 55% relative atmospheric humidity and under 1 kg loading. In this case, the holding time is measured by the standardized measuring method known to those skilled in the art. An adhesive tape having self-adhesive compounds with such holding times ensures that the bonded ends of the webs do not detach from the adhesive tape, even under high tensile stresses, and exposure of the self-adhesive compound does not occur.

The measurement of the holding time is carried out as follows:

In order to measure the holding time of adhesive compounds, these are coated onto a standard carrier (polyester film; thickness: 25 µm). An always constant application of 25 g/m$^2$ is advantageously chosen.

Following drying and possible cross-linking of the adhesive compound, a strip of 13 mm width and at least 20 mm length is cut out and stuck onto a defined paper (for example gravure printing paper, e.g. Neopress T 54, 54 g/m$^2$ or coating body paper, e.g. Mediaprint 135 g/m$^2$). The bonding area is 13 mm×20 mm. In order to ensure a constant contact pressure during bonding, a roller (weight: 2 kg) is rolled slowly twice over the specimen. The test pattern produced in this way is loaded with a weight of 1 kg parallel to the bonding plane and the time during which the adhesive strip remains on the paper is measured. For improved differentiation of the individual adhesive compounds, the test is carried out in a corresponding manner at further testing temperatures (e.g. 40° C. and 70° C.)

With regard to the application of the self-adhesive compounds, in one embodiment the self-adhesive compounds are applied to the carrier at 20 to 60 g/m$^2$, in particular at 20 to 50 g/m$^2$. This ensures that there is an adequate quantity of self-adhesive compound for producing a permanent joint without the self-adhesive compound thickening the adhesive tape too much.

As the material for the self-adhesive compounds, in one embodiment the self-adhesive compound is an acrylate self-adhesive compound. This is composed, for example, of 40 to 90% by weight of acrylic acid and 60 to 10% by weight of butyl acrylate or 40 to 90% by weight of acrylic acid, 30 to 5% by weight of butyl acrylate and 30 to 5% by weight of ethyl hexyl acrylate. Furthermore, it can have ethoxylated alkyl amines as plasticizer, preferably C16 to C18 or with 15 to 25 ethoxy units. Here, the mixture ratio between plasticizer and polymer is between 55 and 75% by weight of plasticizer and 25 and 45% by weight of polymer. The polymerization is carried out radically in polar solvents with ethanol as regulator. Partial cross-linking is carried out with aluminium chelate 0.3 to 1.2% by weight, based on the total quantity. The acrylate self-adhesive compounds can be water-soluble or water-insoluble. In alternative refinements, natural and synthetic rubber compounds and also dispersions of the compounds described above can be used as self-adhesive compounds.

The self-adhesive compounds can be applied in a simple manner to the carrier by strip coating, in one embodiment, the application of two strips of the self-adhesive compounds to the carrier, spaced apart in a defined manner, being possible for those skilled in the art.

In one embodiment, it is proposed as material for the carrier that this consist of tear-resistant paper or tear-resistant film. This can be, inter alia, weakly creped papers, machine-finish body papers, smoothed body papers coated on one side, compacted, printable decorative papers coated on both sides, single-side, double-coated, wood-free, highly glossy kraft papers or other films made of plastics suitable for this purpose which have adequate mechanical strength.

According to one embodiment, the self-adhesive compounds are provided with a covering, for example a covering paper or a release film, in order to be able to handle the adhesive tape in a straightforward manner. In this case, the covering has a perforation or a slit in the longitudinal direction of the adhesive tape, in order firstly to be able to pull off one half of the covering from the first half of the self-adhesive compound in such a way, for example, as to be able to stick the adhesive tape under the outer ply of the web wound on a full reel. The covering is then pulled off the other half of the self-adhesive compound and the adhesive tape is stuck to the web end of the empty reel.

BRIEF DESCRIPTION OF THE DRAWINGS

An exemplary embodiment from the prior art and also an exemplary embodiment of the invention will be explained in more detail below by using the drawings, the cross-sectional illustrations in FIGS. 1 to 4 relating to the prior art, and the cross-sectional illustrations in FIGS. 5 to 8 relating to the invention.

Figure 1:
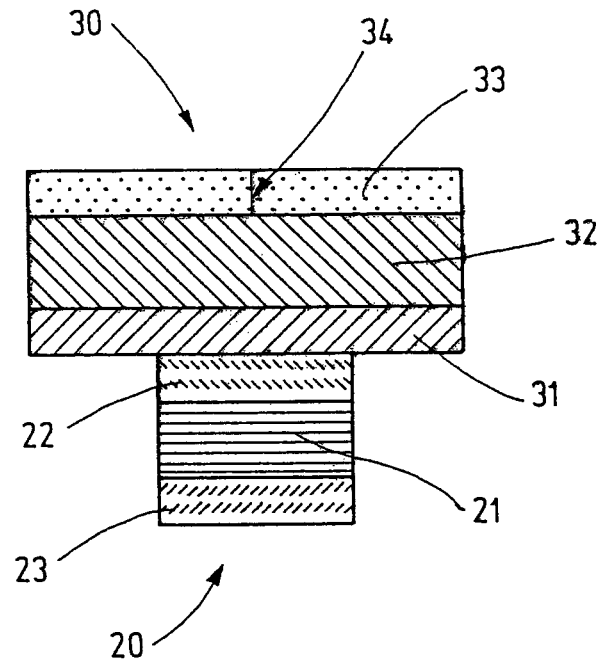
FIG. 1 shows a single-sided adhesive tape.

The exemplary embodiment from the prior art, illustrated in FIG. 1, is a single-sided adhesive tape 30 having a carrier 31, for example a high-strength paper or a plastic film, which is coated with a self-adhesive compound 32 on its upper side. The self-adhesive compound 32 is preferably water-soluble and, for example, an acrylate self-adhesive compound. In order to be able to handle the adhesive tape 30 before the production of a joint between two web materials, the self-adhesive compound 32 is covered with a covering 33, for example a siliconized release paper, in order to avoid the adhesive tape 30 adhering to undesired surfaces.

Arranged on the underside of the adhesive tape 30 is a cleavable system 20 having self-adhesive compounds 22, 23. The carrier 21 of the cleavable system 20 consists, for example, of a sized, highly compacted paper and cleaves under the action of a defined force. The cleavable system 20 is fixed to the underside of the carrier 31 via the self-adhesive compound 22. The cleavable system 20 can be stuck by the further self-adhesive compound 23, for example to the surface of the second outer web of a web material wound up onto a reel. This self-adhesive compound 23 can be provided with a further covering, not depicted here, to prevent adhesion of this self-adhesive compound 23 to further surfaces.

Figure 2:
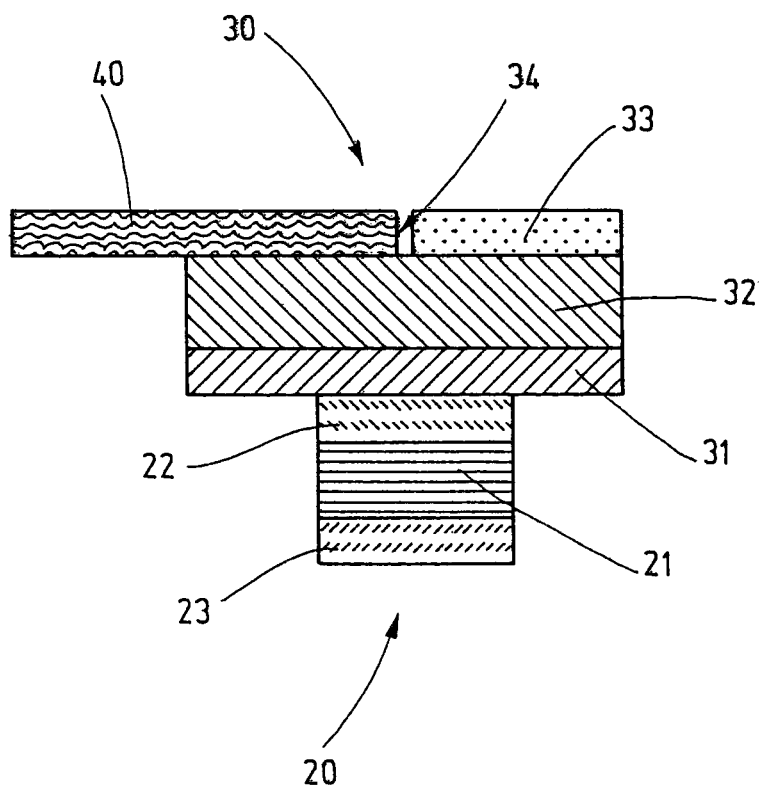
FIG. 2 shows an adhesive tape, of which half is stuck to a web.

The covering 33 is designed here with a slit 34 or perforation, which extends substantially over the entire length of the adhesive tape 30, in order, as viewed in the width of the adhesive tape 30, firstly to be able to pull off only one half of the covering 33 and to be able to fix a first paper web 40 to the self-adhesive compound 32, as illustrated in FIG. 2. This web 40 is, for example, the start of the web material on a full reel or a parent paper reel. The slit 34 between the paper web 40 and the remaining half of the covering 33 can also be slightly larger than the slit 34 between the two coverings 33. The lower self-adhesive compound 23 is then stuck to the second outer web of the wound reel, located underneath it.

Figure 3:
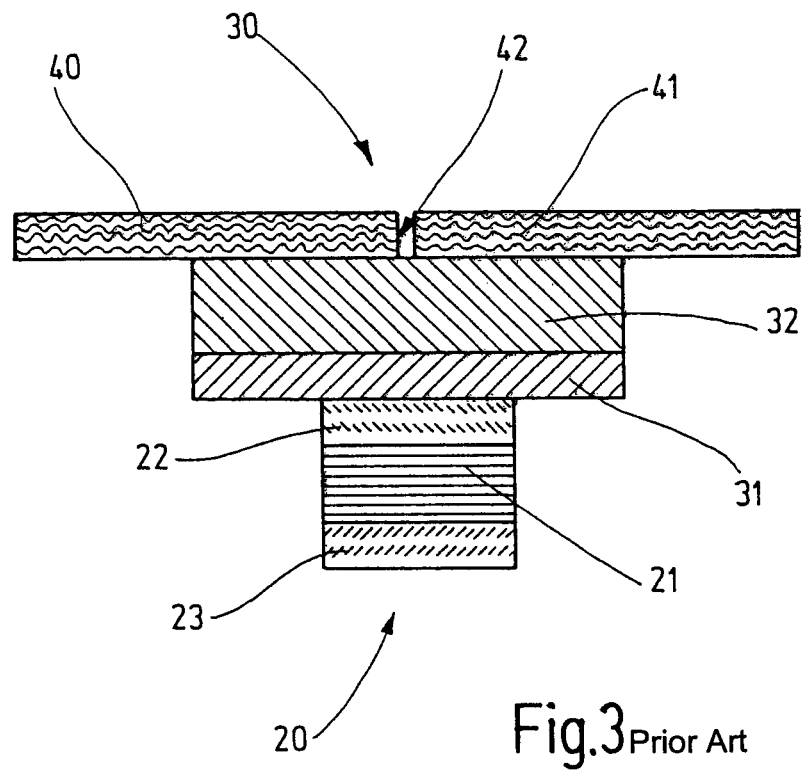
FIG. 3 shows an adhesive tape stuck to two webs.

Then, in accordance with FIG. 3, the second covering 33 is removed and the end of the old web 41, for example from a virtually empty parent paper reel, is likewise stuck to the self-adhesive compound 32, a break 42 arising between the two paper webs 40, 41 here, since it is virtually impossible to firmly stick these two webs exactly with a butt joint on the self-adhesive compound 32 or the cut edges of the webs 40, 41 are not exactly straight.

Figure 4:
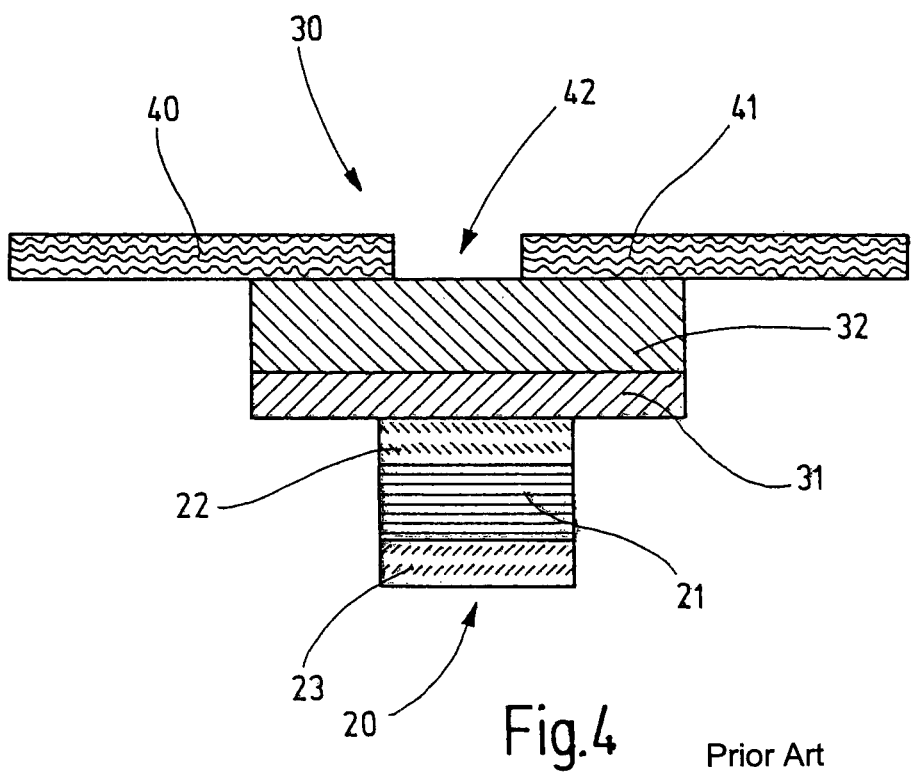
FIG. 4 shows an adhesive tape, a tensile force being exerted on the webs.

FIG. 4 illustrates a joint between two paper webs 40, 41 which is subjected to a tensile loading F, such as occurs for example during the further processing of the bonded webs 40, 41 or even during the acceleration of the new reel. As a result of the tensile force F, the break 42 between the two ends of the webs 40, 41 is enlarged, so that here the surface of the self-adhesive compound 32 is not covered, and thus the self-adhesive compound 32 can adhere to further undesired surfaces and disruption can occur during the further processing of the continuous web.

Figure 5:
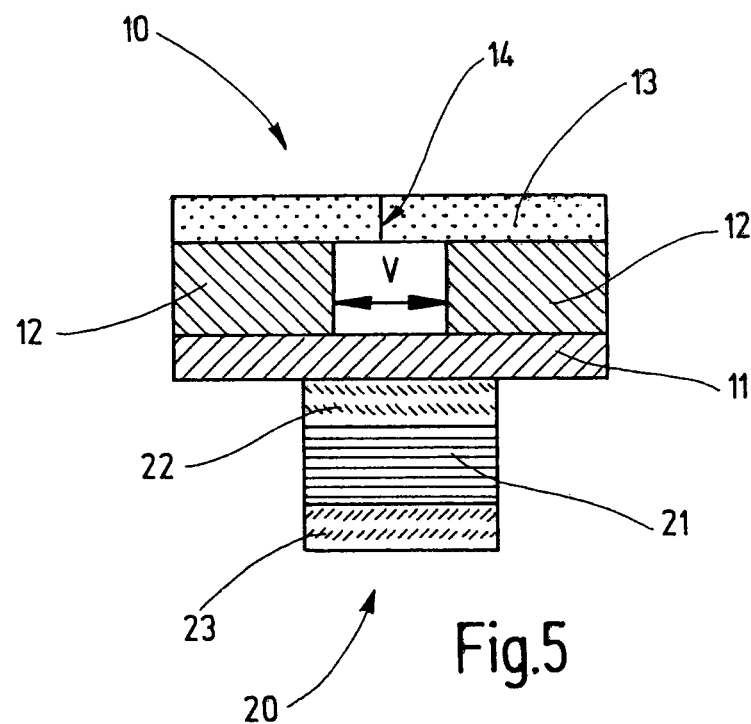
FIG. 5 shows a single-sided adhesive tape.

FIG. 5 illustrates the adhesive tape 10 according to the invention which, on its underside, has a substantially identical cleavable system 20 corresponding to the prior art, that is to say having a cleavable carrier 21 and also self-adhesive compounds 22, 23, and a covering, not illustrated here, for the self-adhesive compound 23. The adhesive tape 10 substantially comprises a carrier 11 made of a material suitable for this purpose and self-adhesive compounds 12, preferably based on acrylate, it being possible for the self-adhesive compound 12 to be water-soluble. The self-adhesive compound 12 is here applied to the carrier 11 in such a way, preferably by strip coating, that a substantially constant spacing V is formed between two regions of the self-adhesive compound 12 on the carrier 11, in order in this way to create a gap or a break between two sections of the self-adhesive compound 12, the self-adhesive compounds 12 preferably being arranged in such a way that they are symmetrical as viewed across the width of the adhesive tape 10. Before the production of a joint between two webs 40, 41, the self-adhesive compounds 12 are provided with a covering 13, which likewise can have a slit 14 or perforation at the centre. The thickness of the carrier 11 with the self-adhesive compound 12 is approximately 0.08 mm, the width about 50 mm. The cleavable system 20 can have a width of about 9 mm.

Figure 6:
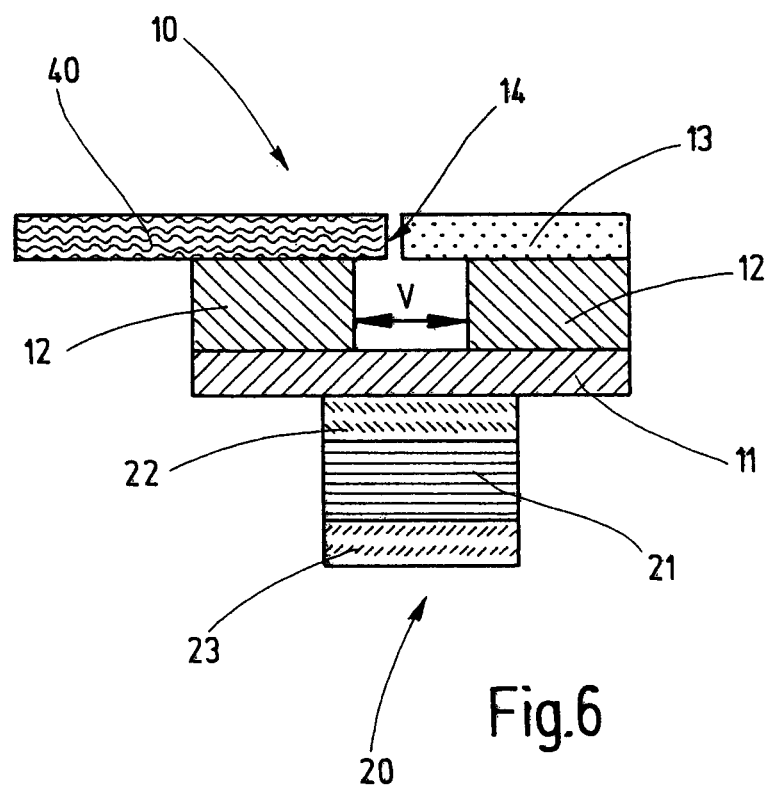
FIG. 6 shows an adhesive tape, of which half is stuck to a web.

In FIG. 6, the first half of the covering 13 has been pulled off and the end of a first web 40 has been stuck to the self-adhesive compound 12. Here, the web 40 has been stuck to the self-adhesive compound 12 in such a way that, viewed towards the centre of the adhesive tape 10, it overlaps the self-adhesive compound 12 or projects beyond the latter. The adhesive tape 10 is then bonded to the second outer ply of the full reel by the self-adhesive compound 23 of the cleavable system 20 in order to fix the end of the web 40 to the reel.

Figure 7:
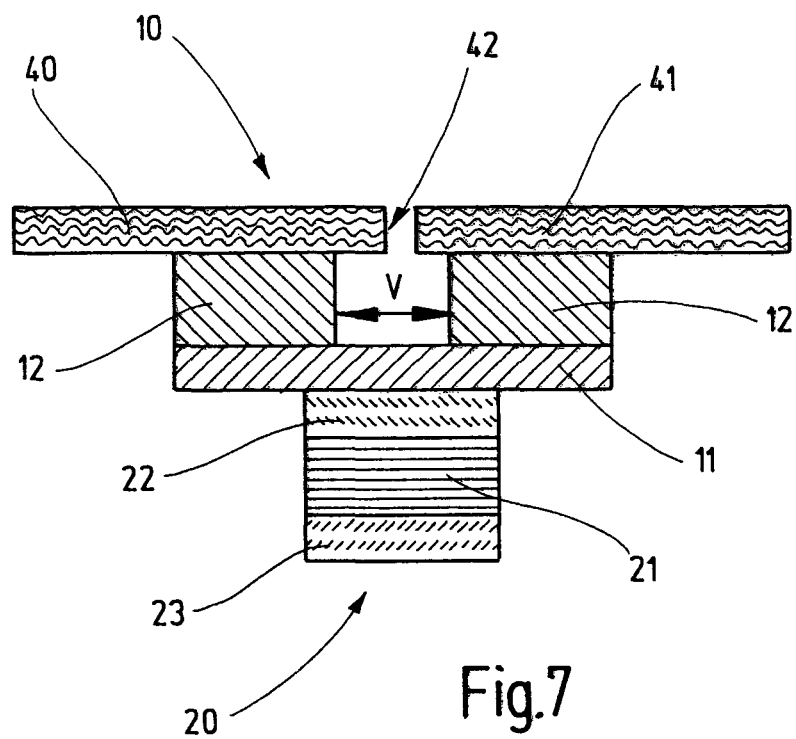
FIG. 7 shows an adhesive tape stuck to two webs.

Then, as illustrated in FIG. 7, the second web 41 is stuck to the self-adhesive compound 12, the break 42 thus formed between the ends of the webs 40, 41 being smaller than the spacing V between the self-adhesive compounds 12.

Figure 8:
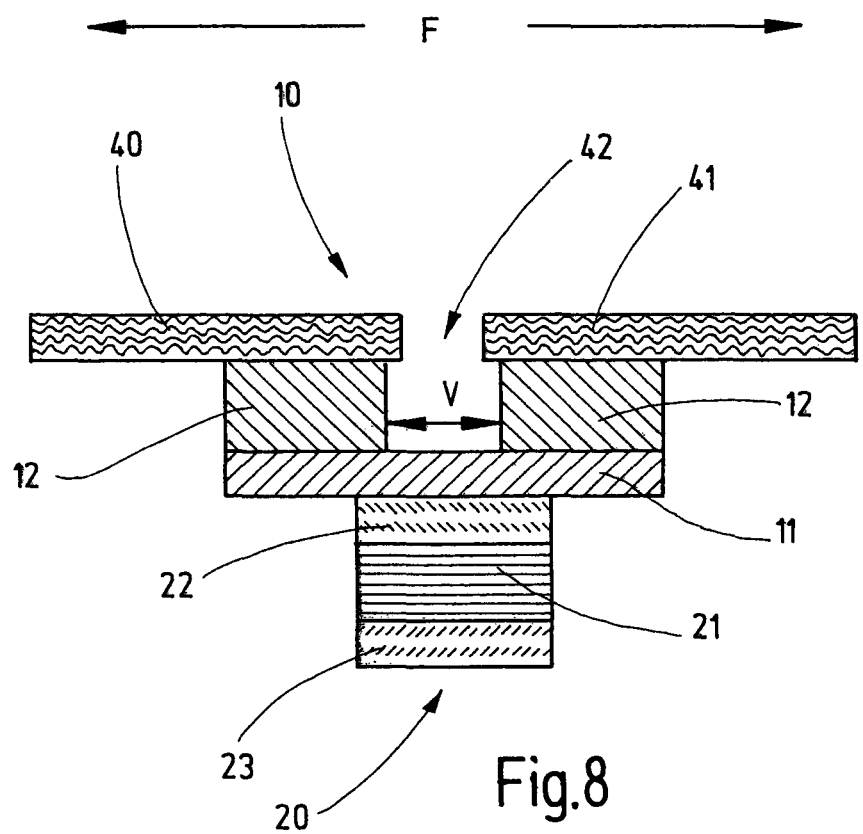
FIG. 8 shows an adhesive tape, a tensile force being exerted on the webs.

If then, according to FIG. 8, for example during further processing, a tensile force F can be exerted on the webs 40, 41, although this can lead to the webs 40, being displaced relative to the self-adhesive compounds 12, as viewed in the horizontal direction, since they were previously stuck to the self-adhesive compounds 12 with a slight break 42, this break 42 is enlarged only slightly and the self-adhesive compound 12 itself continues to be covered by the webs 40, 41, so that it is not possible for adhesion of the self-adhesive compound 12 to further surfaces to occur, and the fault-free progress of the further processing is ensured. It is possible for those skilled in the art to dimension the break 42 and the spacing V appropriately as a function of the selected self-adhesive compound 12, the materials of the webs 40, 41 and of the tensile forces F that occur.

LIST OF REFERENCE SYMBOLS

10 Adhesive tape
11 Carrier
12 Self-adhesive compound
13 Covering
14 Slit
20 Cleavable system
21 Carrier
22 Self-adhesive compound
23 Self-adhesive compound
30 Adhesive tape
31 Carrier
32 Self-adhesive compound
33 Covering
34 Slit
40 Web
41 Web
42 Break
V Spacing
F Tensile force

The invention claimed is:

1. A method for joining two webs, said method comprising:
   (a) providing an adhesive tape, wherein the adhesive tape comprises a carrier layer and a self-adhesive compound adhered to at least one side of the carrier layer, and the self-adhesive compound adhered to said at least one side of the carrier layer comprises at least two distinct regions of self-adhesive compound separated from each other by a gap having a spacing (V), and
   (b) adhering a first end of a first of the two webs to a first of said at least two distinct regions and adhering a second end of a second of the two webs to a second of said at least two distinct regions, wherein the first end of the first of the two webs and the second end of the second of the two webs are adhered such that said first end extends past said first of said at least two distinct regions to cover a portion of the gap and said second of said at least two distinct regions also extends past said second of said at least two distinct regions to cover at least a portion of the gap.

2. Method according to claim 1, wherein the adhesive tape comprises a cleavable system on a side of the carrier opposite that to which the self-adhesive compound is adhered.

3. Method according to claim 2, wherein the carrier is wider than the cleavable system.

4. Method according to claim 1, wherein the self-adhesive compound has a holding time of at least 1000 min. on coating body paper and at least 2000 min. on gravure printing paper, in each case measured at 23° C., and 55% relative atmospheric humidity and under 1 kg loading (F).

5. Method according to claim 1, wherein the self-adhesive compound is applied to the carrier in an amount of 20 to 60 g/m$^2$.

6. Method according to claim 5, wherein the self-adhesive compound is applied to the carrier in an amount of 25 to 50 g/m$^2$.

7. Method according to claim 1, wherein the self-adhesive compound comprises an acrylate base.

8. Method according to claim 1, wherein the self-adhesive compound is applied to the carrier by strip coating.

9. Method according to claim 1, wherein the carrier is a tear-resistant paper or film carrier.

10. Method according to claim 1, which further comprises a covering for the self-adhesive compound.

11. Method according to claim 10, wherein the covering comprises a perforation and/or a slit in a longitudinal direction of the adhesive tape.

* * * * *